US012542221B2

(12) United States Patent
Yokoyama

(10) Patent No.: US 12,542,221 B2
(45) Date of Patent: *Feb. 3, 2026

(54) ELECTROMAGNETIC FIELD CONTROL MEMBER

(71) Applicant: KYOCERA Corporation, Kyoto (JP)

(72) Inventor: Atsushi Yokoyama, Shiga (JP)

(73) Assignee: KYOCERA Corporation, Kyoto (JP)

( * ) Notice: Subject to any disclaimer, the term of this patent is extended or adjusted under 35 U.S.C. 154(b) by 382 days.

This patent is subject to a terminal disclaimer.

(21) Appl. No.: 18/015,692

(22) PCT Filed: Jul. 15, 2021

(86) PCT No.: PCT/JP2021/026677
§ 371 (c)(1),
(2) Date: Jan. 11, 2023

(87) PCT Pub. No.: WO2022/014685
PCT Pub. Date: Jan. 20, 2022

(65) Prior Publication Data

US 2023/0282386 A1 Sep. 7, 2023

(30) Foreign Application Priority Data

Jul. 17, 2020 (JP) ................................ 2020-122743

(51) Int. Cl.
*G21K 1/08* (2006.01)
*G21K 1/087* (2006.01)
*H05H 7/04* (2006.01)

(52) U.S. Cl.
CPC .............. *G21K 1/087* (2013.01); *H05H 7/04* (2013.01)

(58) Field of Classification Search
CPC ................................ G21K 1/087; H05H 7/04
See application file for complete search history.

(56) References Cited

U.S. PATENT DOCUMENTS 11,950,351 B2 * 4/2024 Yokoyama .............. H05H 7/04
12,207,386 B2 * 1/2025 Yokoyama .............. H05H 7/04
(Continued)

FOREIGN PATENT DOCUMENTS

CN 101523665 A 9/2009
CN 103376431 A 10/2013
(Continued)

OTHER PUBLICATIONS

Mitsuda et al., "Beam Preformance Test of Ceramics Chamber With Integrated Pulsed Magnet In Beam Transport-Dump Line For KEK PF-RING", Proceedings of the 16th Annual Meeting of Particle Accelerator Society of Japan, Aug. 3, 2019, pp. 376-380, https://www.pa sj.jp/web_pub1ish/pa sj2019/proceedin gs/PDF/WEPH/WEPH031.pdf.

*Primary Examiner* — Nicole M Ippolito
(74) *Attorney, Agent, or Firm* — Procopio, Cory, Hargreaves & Savitch LLP

(57) ABSTRACT

An electromagnetic field control member includes an insulating member made of a ceramic having a cylindrical shape, the insulating member including a plurality of through holes extending along an axial direction; an electrically conductive member configured to seal off each of the plurality of through holes, the electrically conductive member comprises a plurality of rod-shaped members connected to each other along the axial direction; and a plurality of power feed terminals each having a plate shape and configured to bond with the electrically conductive member in a respective one of the plurality of through holes to supply electricity from the outside.

14 Claims, 15 Drawing Sheets

(56) References Cited

U.S. PATENT DOCUMENTS

| | | | |
|---|---|---|---|
| 2005/0045821 | A1 | 3/2005 | Noji et al. |
| 2020/0105433 | A1 | 4/2020 | Iwamoto et al. |
| 2022/0330413 | A1 | 10/2022 | Yokoyama |
| 2022/0338339 | A1 | 10/2022 | Yokoyama |

FOREIGN PATENT DOCUMENTS

| | | | |
|---|---|---|---|
| CN | 110431920 | A | 11/2019 |
| EP | 4025017 | A1 | 7/2022 |
| JP | H11-283795 | A | 10/1999 |
| WO | 2018/174298 | A1 | 9/2018 |

* cited by examiner

ELECTROMAGNETIC FIELD CONTROL MEMBER

TECHNICAL FIELD

The present disclosure relates to an electromagnetic field control member, the member being used in accelerators or the like for accelerating charged particles such as electrons and heavy particles.

BACKGROUND OF INVENTION

In the related art, there has been a demand for high speed, high magnetic field power, and high repeatability with regard to an electromagnetic field control member that is used in accelerators for accelerating charged particles such as electrons and heavy particles. For such improvements in performance, Ceramics Chamber with integrated Pulsed-Magnet (hereinafter referred to as CCiPM) has been proposed by Chikaori Mitsuda et al. of the High Energy Accelerator Research Organization (Non Patent Document 1).

CCiPM includes: an insulating member having a cylindrical shape, the insulating member being made of a ceramic; a through hole formed along an axial direction of the insulating member, the through hole extending through a thickness direction of the insulating member; and an electrically conductive member having a substrate shape, the electrically conductive member being embedded in the through hole. The electrically conductive member serves as a part of a partition wall that separates an inside and an outside of the insulating member, and secures airtightness inside the insulating member.

To maintain the airtightness of a space located inside the insulating member over an extended period of time, the present applicant has proposed an electromagnetic field control member that includes an insulating member made of a ceramic having a tubular shape, the insulating member including a plurality of through holes along an axial direction; an electrically conductive member made of a metal, the electrically conductive member sealing off each of the through holes and leaving an opening portion in the through hole, the opening portion opening to an outer periphery of the insulating member; and a power feed terminal connected to the electrically conductive member. The power feed terminal is separated from inner walls of the insulating member, the inner walls forming the through hole, include a first end and a second end in an axial direction, and at least one of the first end or the second end is further separated from the inner walls than a center portion of the power feed terminal (Patent Document 1).

CITATION LIST

Patent Literature

Patent Document 1: WO 2018/174298

Non-Patent Literature

Non Patent Document 1:Chikaori Mitsuda and twelve others, "Performance Test of Ceramics Chamber with integrated Pulsed-Magnet Beam in KEK-PF Ring Beam Transport Path Dump Line" Proceedings of the 16th Annual Meeting of Particle Accelerator Society of Japan, Jul. 31-Aug. 3, 2019, Kyoto, Japan (PASJ2019 WEPH031), p. 376-380

SUMMARY

An electromagnetic field control member of the present disclosure includes an insulating member made of a ceramic having a cylindrical shape, the insulating member including a plurality of through holes extending along an axial direction, an electrically conductive member having a long shape and sealing off the plurality of through holes, and a plurality of power feed terminals each having a plate shape and configured to bond with the electrically conductive member in a respective one of the plurality of through holes to supply electricity from the outside. The electrically conductive member includes a plurality of rod-shaped members connected to each other along an axial direction.

DESCRIPTION OF EMBODIMENTS

An electromagnetic field control member according to an embodiment of the present disclosure will be described below with reference to the drawings. The present embodiment provides an electromagnetic field control member including an electrically conductive member capable of improving stability and durability even when heating and cooling are repeated. In the present embodiment, an example of a ceramic chamber with an integrated pulsed magnet (CCiPM) is described as an embodiment of the electromagnetic field control member.

Figure 1A:
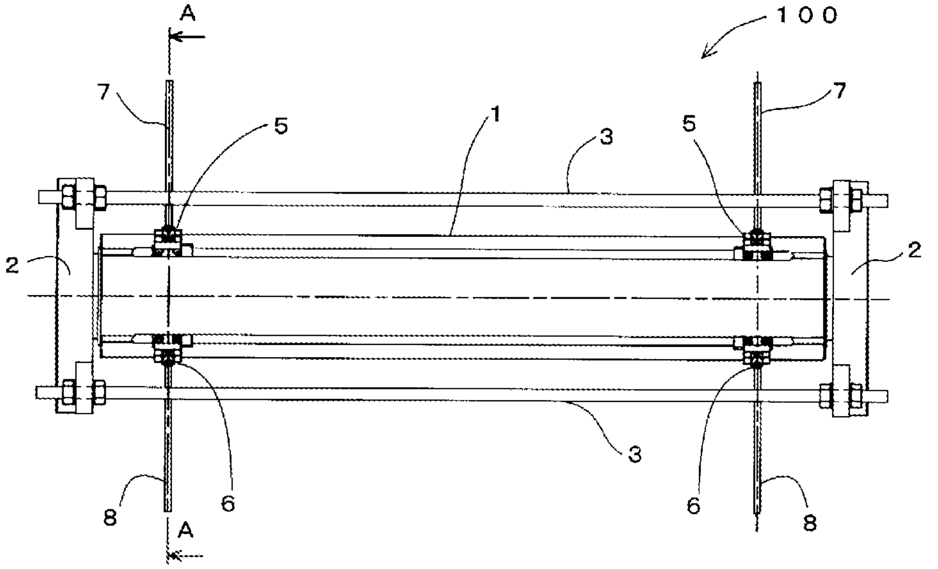
FIG. 1A is a front view illustrating an electromagnetic field control member according to an embodiment of the present disclosure.

FIG. 1A illustrates an electromagnetic field control member 100 according to an embodiment of the present disclosure, which is a CCiPM. An electromagnetic field control member 100 illustrated in FIG. 1 includes an insulating member 1 and flanges 2, 2 respectively located at two ends of the insulating member 1. The flanges 2 and 2 are connected to each other by shafts 3.

Figure 1B:
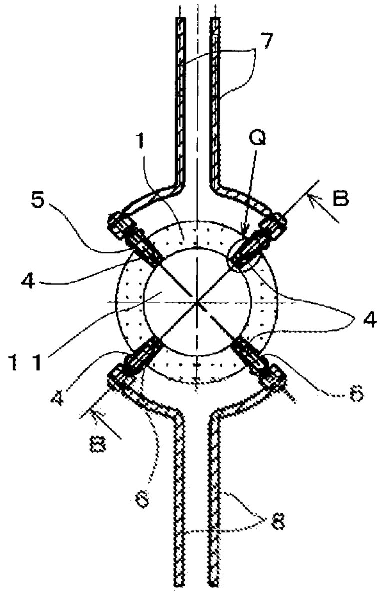
FIG. 1B is a cross-sectional view taken along a line A-A in FIG. 1A.

As illustrated in FIG. 1B, which is a cross-sectional view taken along a line A-A in FIG. 1A, the insulating member 1 is made of a ceramic having a tubular shape. The insulating member 1 includes a plurality of through holes 4 extending in an axial direction. Here, "axial direction" refers to a direction along a center axis of the insulating member 1 made of the ceramic having the tubular shape.

The insulating member 1 includes a plurality of first power feed terminals 5 and a plurality of second power feed terminals 6 on two end portions thereof, respectively. Each of the first power feed terminals 5 is a terminal for feeding electric power, and as illustrated in FIG. 1B, is connected to an external device via a line 7. Each of two adjacent second power feed terminals 6 is electrically connected to another external device via a line 8.

Figure 2:
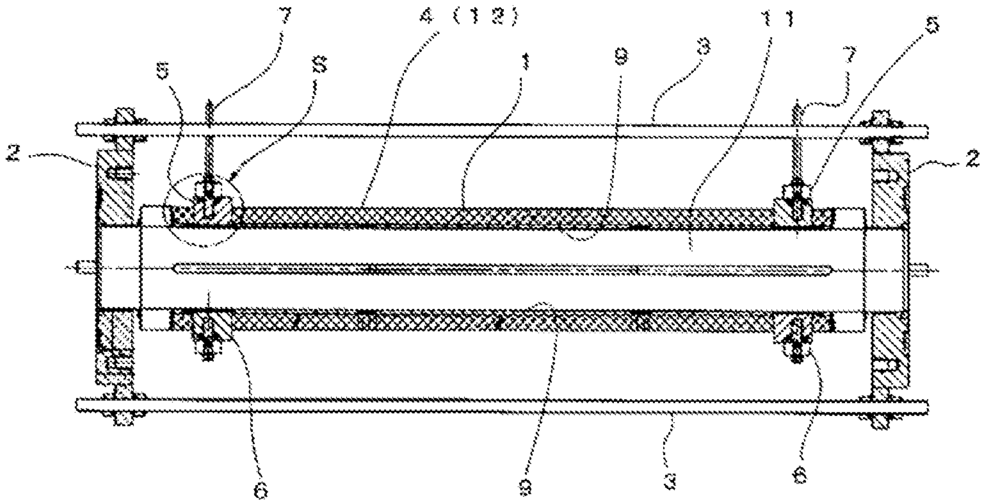
FIG. 2 is an enlarged view of a region P in a cross-sectional view (c) taken along a line B-B in FIG. 1B.
Figure 3:
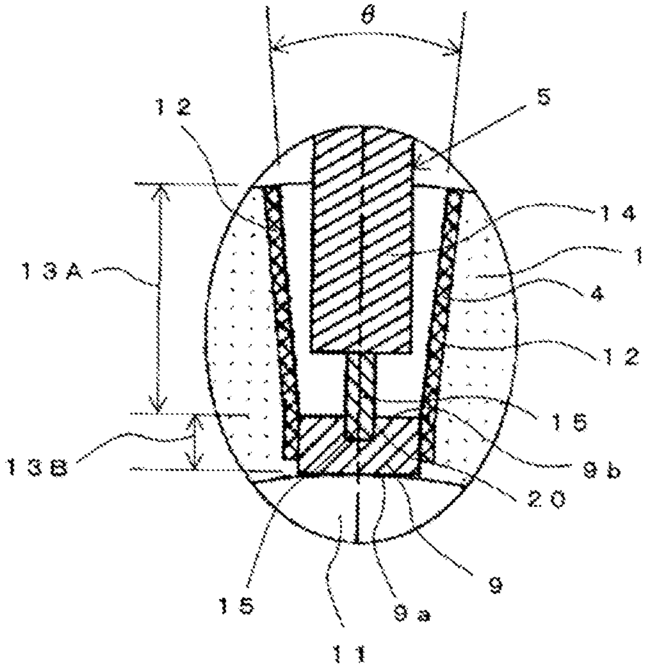
FIG. 3 is an enlarged view of a region Q in FIG. 1B.

As illustrated in FIG. 2, which is a cross-sectional view taken along a line B-B in FIG. 1B, and in FIG. 3, which is an enlarged view of the region Q in FIG. 1B, an electrically conductive member 9 is disposed in each of the through holes 4. The electrically conductive member 9 is made of a metal such as copper and extends in the axial direction along with each of the through holes 4. As illustrated in FIG. 3, the electrically conductive member 9 seals off each of the through holes 4. The electrically conductive member 9 sealing off the through hole 4 ensures the airtightness of the space 11 surrounded by the inner periphery of the insulating member 1. Particularly, the electrically conductive member 9 is preferably made of an oxygen-free copper (e.g., alloy number C1020 as specified in JIS H 3100:2012 or alloy number C1011 as specified in JIS H 3510:2012).

The electrically conductive member 9 secures a conductive region for driving an induced current excited so as to accelerate or deflect electrons, heavy particles, and the like that move within the space 11. The electrically conductive member 9 may have a flat shape as illustrated in FIG. 3, but is preferably curved along the inner periphery of the insulating member 1 having the tubular shape. In a case where the electrically conductive member 9 has a flat shape, the flatness of each of an inner surface 9*a* on the space 11 side and an outer surface 9*b* on the outer side is preferably 50 μm or less.

The parallelism of the outer surface 9*b* with respect to the inner surface 9*a* is preferably 70 μm or less.

When at least one of the flatness and the parallelism is within the range described above, airtightness of the space 11 is improved.

The first power feed terminals 5 and the second power feed terminals 6 are each connected to the electrically conductive member 9 in the through hole 4 of the insulating member 1, so as to provide electrical power from the external device to the electrically conductive member 9 at or near both ends of the electrically conductive member 9 disposed along the axial direction.

As illustrated in FIG. 3, a metallization layer 12 is formed on inner walls of the insulating member 1, the inner walls facing each other across the through hole 4. The metallization layer 12 is formed from one end surface to the other end surface, the end surfaces forming the through hole 4 extending along the axial direction.

The metallization layer 12 includes, for example, molybdenum as a main constituent and manganese as well. In this case, out of 100 mass % of the components constituting the metallization layer 12, for example, the content of molybdenum is 80 mass % or more and 85 mass % or less, and the content of manganese is 15 mass % or more and 20 mass % or less. A surface of the metallization layer 12 may include a metal layer including nickel as a main constituent. Note that a plating layer may be formed instead of the metallization layer 12. The thickness of the metallization layer 12 is, for example, 15 μm or more and 45 μm or less. The thickness of the metal layer is, for example, 0.1 μm or more and 2 μm or less.

As illustrated in FIG. 3, inner walls of the insulating member 1, the inner walls including the metallization layer 12, include: inclined walls 13A for which a width (gap) between inner walls facing each other gradually increases from an inner periphery of the insulating member 1 to an outer periphery of the same; and vertical walls 13B located on an inner peripheral side of the insulating member 1 and for which a width between inner walls facing each other is constant. The inclined walls 13A and the vertical walls 13B are preferably provided throughout the entire length of the through hole 4.

The inner walls of the insulating member 1 include the inclined walls 13A, stress remaining in the insulating member 1 is relaxed, and thus cracking in the insulating member 1 can be suppressed over an extended period of time.

In a cross section orthogonal to the axial direction, the angle θ (see FIG. 3) formed by the inner walls facing each other across the through hole 4 may be 8° or more, preferably 12° or more, and 20° or less, preferably 16° or less. When the angle θ is within this range, the mechanical strength of the insulating member 1 can be maintained, and cracking in the insulating member 1 can be further suppressed.

Note that the angle θ formed by the inner walls facing each other may be measured in a cross section orthogonal to the axial direction.

The three-point bending strength, which indicates the mechanical strength of the insulating member 1, is, for example, 350 MPa or greater. The three-point bending strength may be measured in accordance with JIS R 1601:2008 (ISO 14704:2000 (MOD)).

On the other hand, the vertical walls 13B are formed on the inner peripheral side of the insulating member 1, thus suppressing a gap from forming between a side surface of the electrically conductive member 9 and the metallization layer 12 formed on the inner walls due to variation in the angle of the inclined walls 13A, and thus the airtightness between the electrically conductive member 9 and the insulating member 1 increases, and the airtightness throughout the electromagnetic field control member 100 improves. The inclined walls 13A and the vertical walls 13B are preferably continuous.

As illustrated in FIG. 3, the first power feed terminal 5 is inserted into the through hole 4 along the radial direction of the insulating member 1, and includes a bottom portion that is in contact with the electrically conductive member 9. In other words, the first power feed terminal 5 is provided upright on the electrically conductive member 9. The first power feed terminal 5 is made of a metal such as copper, and the line 7 is connected to the rear end portion as described above. The line 7 is made of a metal such as copper, and, is preferably made of, in particular, an oxygen-free copper (e.g., alloy number C1020 as specified in JIS H 3100:2012 or alloy number C1011 as specified in JIS H 3510:2012).

Figure 4:
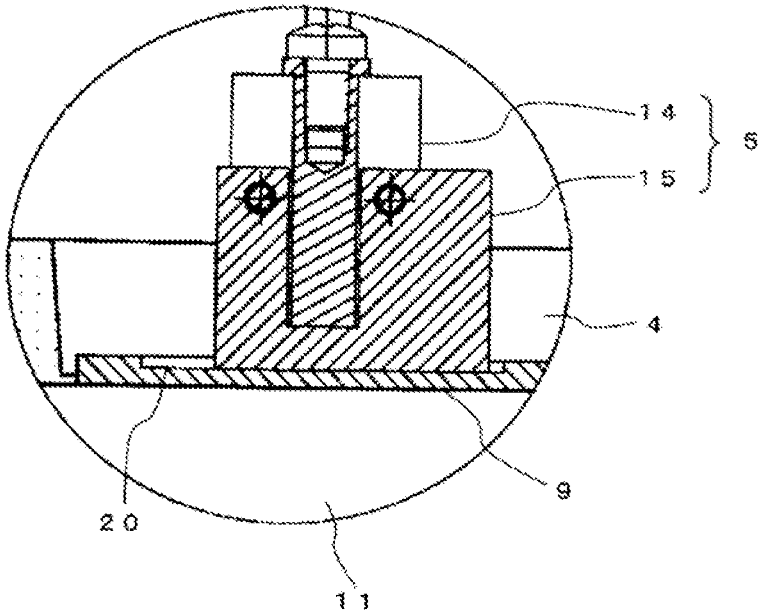
FIG. 4 is an enlarged view of a region S in FIG. 2.
Figure 5A:
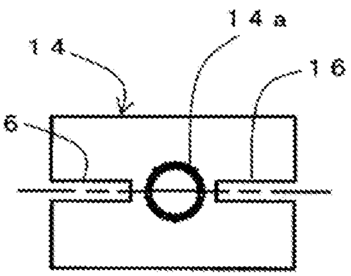
FIGS. 5A, 5B and 5C are a plan view, a front view, and a side view, respectively, illustrating an example of an H-type terminal in a power feed terminal.

As illustrated in FIGS. 3 and 4 (enlarged view of the region S in FIG. 2), the first power feed terminal 5 includes an H-type terminal 14 and a U-type terminal 15 that supports the H-type terminal 14. As illustrated in FIG. 5A, the H-type terminal 14 has an H shape in the top surface view, and gaps 16 and 16 are formed on both sides, and a hole 14*a* for fixing (screwing or the like) a tip of the line 7 is formed in a center portion.

Figure 5B:
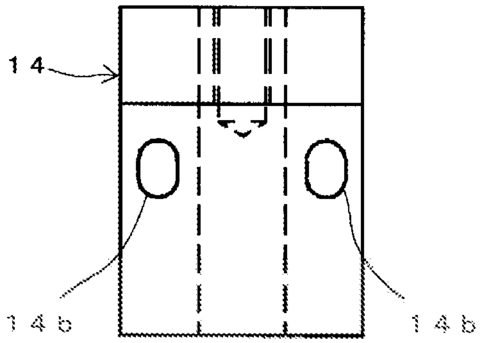
Figure 5C:
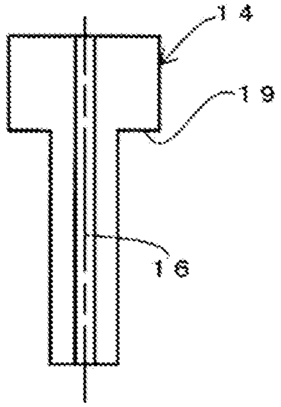

As illustrated in FIG. 5B, first screw insertion holes 14*b* are formed on both sides of the H-type terminal 14. As illustrated in FIG. 5C, the H-type terminal 14 has a T shape in a side view.

Figure 6A:
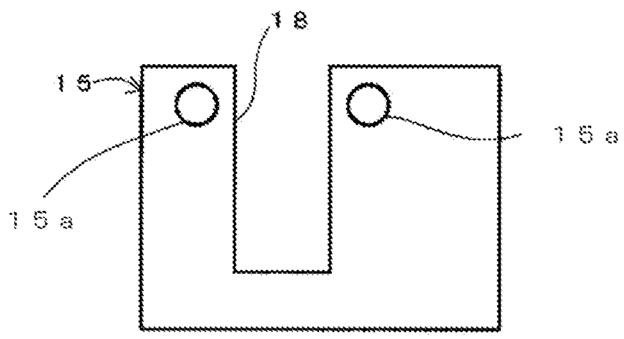
FIGS. 6A and 6B are a front view and a side view, respectively, illustrating an example of a U-type terminal in the power feed terminal.
Figure 6B:
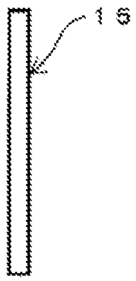

On the other hand, as illustrated in FIGS. 6A and 6B, the U-type terminal 15 is formed to have a plate shape and includes a notch portion 18, and second screw insertion holes 15*a* are formed on both sides of the notch portion 18.

In order to assemble the first power feed terminal 5, the U-type terminal 15 is inserted into the gaps 16 and 16 on both sides of the H-type terminal 14, a step 19 (see FIG. 5C) located on the upper portion of the H-type terminal 14 is brought into contact with the upper end of the U-type terminal 15, and then the first screw insertion holes 14*b* and the second screw insertion holes 15*a* are made to communicate with each other and are connected with bolts (not illustrated).

The tip of the line 7 is screwed into the hole 14*a* in the center portion of the H-type terminal 14, and thus the first power feed terminal 5 and the line 7 are electrically connected to each other. On the other hand, as illustrated in FIGS. 3 and 4, a groove 20 is formed in a predetermined range along the axial direction of the insulating member 1 on an upper surface (surface on the through hole 4 side) of the electrically conductive member 9. A lower end portion of the U-type terminal 15 is fitted into the groove 20, and the first power feed terminal 5 is provided upright on the electrically conductive member 9. In this way, since the first power feed terminal 5 is constituted by only two of the H-type terminal 14 and the U-type terminal 15, the number of parts is small, and the terminals can be easily fixed to and removed from each other.

The lower end portion of the U-type terminal 15 is fitted into the groove 20, and thus the first power feed terminal 5 is stably provided upright on the electrically conductive member 9.

The groove 20 has a long shape, and an end surface of each of two end portions of the groove 20 may have a curved shape or may include a corner portion having a chamfered structure. With such a structure, even when heating and cooling are repeated during use, a thermal stress is easily absorbed and relaxed at a rod-shaped member 92, and cracking is less likely to occur in the rod-shaped member 92. Since the second power feed terminal 6 illustrated in FIGS. 1 and 2 has the same or similar configuration as that of the first power feed terminal 5, the second feed terminal 6 is provided upright on the electrically conductive member 9 in the same manner as the first power feed terminal 5.

Figure 7A:
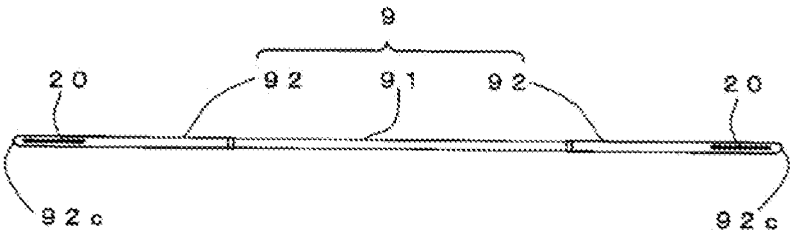
FIGS. 7A and 7B are a plan view and a side view, respectively, illustrating an example of an electrically conductive member including a plurality of rod-shaped members.
Figure 7B:

As illustrated in FIGS. 7A and 7B, the electrically conductive member 9 includes a plurality of rod-shaped members 91 and 92 having a rectangular shape. The rod-shaped members 92 are connected to both ends of the rod-shaped member 91 along the axial direction. That is, since the electrically conductive member 9 is substantially divided into a plurality of portions, even when heating and cooling are repeated during use, thermal stress is easily absorbed and relaxed at each of the rod-shaped members 91 and 92, and cracking is less likely to occur in the rod-shaped members 91 and 92. Thus, stability and durability can be improved. Also, mounting of the rod-shaped members 91 and 92 into the through hole 4 becomes easy.

In the present embodiment, the electrically conductive member 9 includes the rod-shaped member 91 located in a center region of the through hole 4, and the rod-shaped members 92 and 92 located in two end portion regions of the through hole 4, the through hole 4 being along the axial direction of the insulating member 1, and the rod-shaped member 91 in the center region has a length longer than each of the rod-shaped members 92 in the two end portion regions. Thus, mounting of the rod-shaped members 91 and 92 into the through hole 4 is further facilitated.

Note that the rod-shaped member 91 and the rod-shaped member 92 may have the same length, or conversely, the rod-shaped member 91 in the center region may be shorter than the rod-shaped member 92 in the end portion region. Although the three rod-shaped members 91, 92, and 92 are used in the example described above, the two rod-shaped members that have the same or different lengths from each other may be connected to each other, and the number of rod-shaped members to be connected is not particularly limited.

Figure 8:
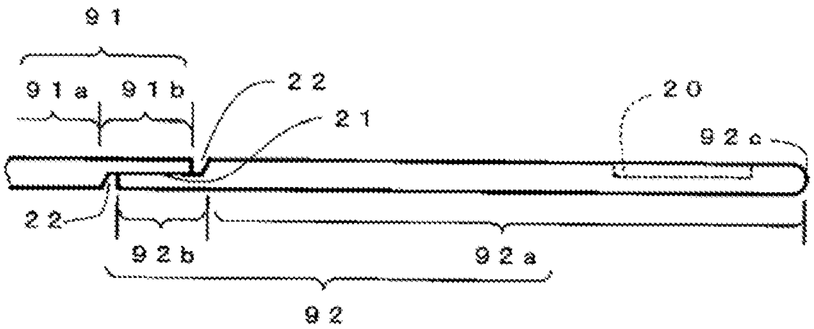
FIG. 8 is an enlarged view of an end portion region in FIG. 7B.

As illustrated in FIG. 8, which is an enlarged view of the end portion region in FIG. 7B, the rod-shaped members 91 and 92 include body portions 91*a* and 92*a*, respectively, each having a long shape and extending along the axial direction of the insulating member 1, and connecting portions 91*b* and 92*b* extending along the axial direction from the body portions 91*a* and 92*a*, respectively. The connecting portions 91*b* and 92*b* include step surfaces 21 and 21 located between the upper and lower surfaces of the body portions 91*a* and 92*a*, respectively.

As a result, even when heating and cooling are repeated, the thermal stress is easily absorbed and relaxed at the connecting portions 91*b* and 92*b*, which further reduces the risk of occurrence of the cracking in the rod-shaped members 91 and 92.

As illustrated in FIG. 8, the rod-shaped members 91 and 92 adjacent to each other are connected to each other by overlapping the step surfaces 21 and 21 of the connecting portions 91*b* and 92*b* adjacent to each other, respectively. The connection is preferably performed by bonding both step surfaces 21 and 21 to each other by, for example, a brazing portion (not illustrated) in order to enhance the long-term reliability of the bonding. In that case, the number of brazing portions is peripherally two or less. Since the brazing portion is an electrical contact, electrical contact resistance can be suppressed by limiting the number of electrical contacts. For example, silver solder (e.g., BAg-8, BAg-8A, BAg-8B) can be used as the brazing material for forming the brazing portion.

Note that in FIGS. 7B and 8, the step surfaces 21 and 21 are located between the upper and lower surfaces of the body portions 91*a* and 92*a*, respectively, but the step surfaces 21 and 21 may be located between both side surfaces of the body portions 91*a* and 92*a*, respectively.

As illustrated in FIG. 8, a gap portion 22 is preferably provided between an end surface of the body portions 91*a* or 92*a* included in one rod-shaped member 91 or 92, respectively, and an end surface of the connecting portion 91*b* or 92*b* included in the other rod-shaped member 92 or 91, respectively, among the rod-shaped members 91 and 92 adjacent to each other. Even when the rod-shaped members 91 and 92 expand and contract due to repeated heating and cooling, there is the gap portion 22, and thus an impact applied to the end surfaces of the connecting portion 91*b* and the body portion 92*a* and the end surfaces of the connecting portion 92*b* and the body portion 91*a* can be reduced. The length of the gap portion 22 in the axial direction is, for example, equal to or larger than 0.8 mm and equal to or less than 1.2 mm.

End surfaces 92*c* of tip portions of the rod-shaped member 92 located at the two end portions of the through hole 4 along the axial direction of the insulating member 1 preferably have a curved shape. Since the tip portion of the rod-shaped member 92 is on the non-connecting side, the end surface 92*c* of the tip portion is formed to have the curved shape, and thus stress concentration at the tip portion on the non-connecting side can be alleviated. Note that the end surface 92*c* may have the curved shape in at least a plan view, but may have the curved shape in a side view (that is, across the entire periphery).

Further, instead of having the curved shape, the end surface 92*c* of the tip portion of the rod-shaped member 92 may include the corner portion having the chamfered structure. (C-chamfered, R-chamfered, etc.) at least in a plan view.

Figure 9A:
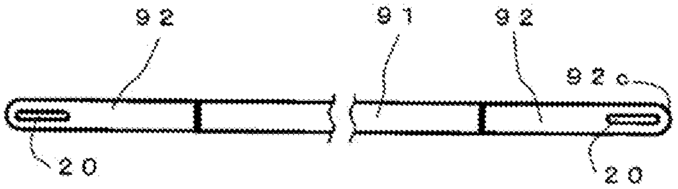
FIGS. 9A and 9B are a plan view and a cross-sectional view, respectively, illustrating another example of the electrically conductive member including the plurality of rod-shaped members.
Figure 9B:
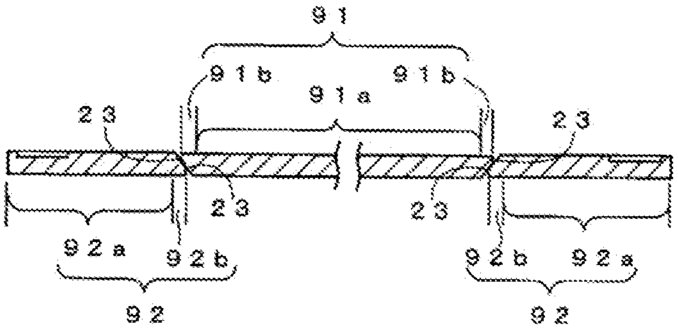

FIGS. 9A and 9B illustrate another connecting structure of the plurality of rod-shaped members 91 and 92. That is, as illustrated in FIGS. 9A and 9B, the rod-shaped members 91 and 92 include the body portions 91*a* and 92*a*, respectively, each having a long shape and extending along the axial direction, and the connecting portions 91*b* and 92*b* extending along the axial direction from the body portions 91*a* and 92*a*, respectively, and the connecting portions 91*b* and 92*b* include inclined surfaces 23 located between an upper surface and a lower surface of the body portions 91*a* and 92*a*, respectively. The rod-shaped members 91 and 92 adjacent to each other are connected to each other by bonding the inclined surfaces 23 and 23 included in the connecting portions 91*b* and 92*b*, respectively, with a brazing portion (not illustrated). Also, in the case of connecting with the connecting portions 91*b* and 92*b* having such inclined surfaces 23, respectively, the stress remaining in the insulating member 1 is alleviated, and thus the cracking in the insulating member 1 can be suppressed over an extended period of time. The brazing material for forming the brazing portion is, for example, silver solder (e.g., BAg-8, BAg-8A, BAg-8B).

Note that the inclined surfaces 23 and 23 may be located between both side surfaces of the body portions 91*a* and 92*a*, respectively, instead of between the upper and lower surfaces of the body portions 91*a* and 92*a*, respectively.

The insulating member 1 has electrical insulation and non-magnetic properties, and is made of, for example, a ceramic containing aluminum oxide as a main constituent, a ceramic containing zirconium oxide as a main constituent, the ceramic containing aluminum oxide as a main constituent being particularly preferable. When the ceramic contains aluminum oxide as a main constituent, the ceramic may contain magnesium, calcium, and silicon as oxides.

The average particle size of aluminum oxide crystals is preferably 5 μm or more and 20 μm or less.

When the average particle size of the aluminum oxide crystals is within the range described above, a surface area of a grain boundary phase per unit surface area decreases compared with when the average particle size is less than 5 μm, and thus thermal conductivity improves. On the other hand, compared with when the average particle size exceeds 20 μm, the surface area of the grain boundary phase per unit surface area increases, and the adhesiveness of the metallization layer 12 increases due to the anchor effect of the metallization layer 12 in the grain boundary phase, such that reliability improves and mechanical properties increase.

In the particle size of the aluminum oxide crystals, for example, inner surface at 0.6 mm is polished from a surface of the insulating member 1 in a depth direction with a copper grinder using diamond abrasive particles having an average particle size $D_{50}$ of 3 μm. Thereafter, diamond abrasive particles with an average particle size $D_{50}$ of 0.5 μm are used for polishing with a tin grinder. A polished surface obtained by the polishing steps is subjected to thermal treatment at 1480° C. until crystal particles and a grain boundary layer are distinguishable, and a cross section as an observation surface is obtained. The heat treatment is performed for approximately 30 minutes, for example.

"Kurtosis" generally refers to a statistical amount that indicates a degree to which a distribution deviates from the normal distribution, indicating the sharpness of the peak and the spread of the tail. When the kurtosis is less than 0, the peak is gentle and the tail is short. When the kurtosis is larger than 0, the peak is sharp and the tail is long. The kurtosis of a normal distribution is 0. The kurtosis can be determined by the function Kurt provided in Excel (Microsoft Corporation), using the particle sizes of the crystals. To make the kurtosis 0 or more, for example, the kurtosis of the particle size distribution of aluminum oxide powder, which is a raw material, may be set to 0 or more.

A thermally treated surface is observed under an optical microscope and photographed, for example, at a magnification factor of 400×. Within the captured image, a range of an area of $4.8747 \times 10^2$ μm$^2$ is defined as a measurement range. By analyzing the measurement range using image analysis software (e.g., Win ROOF, manufactured by Mitsubishi Corporation), particle sizes of individual crystals can be obtained, and the average particle size of the crystals is the arithmetic average of the particle sizes, which are equivalent circle diameters of individual crystals.

Here, the kurtosis of the particle size distribution of the aluminum oxide crystals is preferably 0 or more. Accordingly, variations in the particle sizes of the crystals are suppressed and thus localized reduction in mechanical strength is less likely to occur. In particular, the kurtosis of the particle size distribution of the aluminum oxide crystals is preferably 0.1 or more.

"Kurtosis" generally refers to a statistical amount that indicates a degree to which a distribution deviates from the normal distribution, indicating the sharpness of the peak and the spread of the tail. When the kurtosis is less than 0, the peak is gentle and the tail is short. When the kurtosis is larger than 0, the peak is sharp and the tail is long. The kurtosis of a normal distribution is 0. The kurtosis can be determined by the function Kurt provided in Excel (Microsoft Corporation), using the particle sizes of the crystals. To make the kurtosis 0 or more, for example, the kurtosis of the particle size distribution of aluminum oxide powder, which is a raw material, may be set to 0 or more.

Here, "ceramic having aluminum oxide as a main constituent" refers to a ceramic having an aluminum oxide content, with Al converted to $Al_2O_3$, of 90 mass % or more, with respect to all the constituents constituting the ceramic being 100 mass %.

Here, "ceramic having zirconium oxide as a main constituent" refers to a ceramic having a zirconium oxide content, with Zr converted to $ZrO_2$, of 90 mass % or more, with respect to all the constituents constituting the ceramic being 100 mass %.

The components included in the ceramics are identified by using an X-ray diffractometer (XRD) employing a CuKα beam, and then, the content of the elements may be determined by using a fluorescent X-ray analyzer (XRF) or an ICP emission spectrophotometer (ICP) and converted into the content of the identified components.

Dimensions of the insulating member 1 are set to, for example, an outer diameter of 35 mm or more and 45 mm or less, an inner diameter of 25 mm or more and 35 mm or less, and a length in an axial direction of 340 mm or more and 420 mm or less.

When obtaining the insulating member 1 made of the ceramic containing aluminum oxide as the main constituent, an aluminum oxide powder, which is the main constituent, a magnesium hydroxide powder, a silicon oxide powder, a calcium carbonate powder, and, as necessary, a dispersing agent that disperses an aluminum oxide powder are ground and mixed in a ball mill, a bead mill, or a vibration mill to form a slurry, and the slurry, after a binder is added and mixed therewith, is spray dried to obtain granules containing aluminum oxide as the main constituent.

To make the kurtosis of the particle size distribution of the aluminum oxide crystals 0 or more, the time for grinding and mixing is adjusted so that the kurtosis of the particle size distribution of the powders is 0 or more.

Here, the average particle size ($D_{50}$) of the aluminum oxide powder is 1.6 μm or more and 2.0 μm or less, and of a total of 100 mass % of the powder, the content of the magnesium hydroxide powder is 0.43 to 0.53 mass %, the content of the silicon oxide powder is 0.039 to 0.041 mass %, and the content of the calcium carbonate powder is 0.020 to 0.022 mass %.

Next, a molding die is filled with the granules obtained by the method described above and a powder compact is obtained using an isostatic press method (rubber press method) or the like with a molding pressure of, for example, 98 MPa or more and 147 Mpa or less.

After molding, pilot holes having a long shape that serve as the plurality of through holes 4 along the axial direction of the insulating member 1 and pilot holes that open end surfaces on both sides along the axial direction of the insulating member 1 are formed by cut processing, so as to make each into a powder compact having a cylindrical shape.

As necessary, the powder compact formed by cut processing is heated for 10 to 40 hours in a nitrogen atmosphere, is held for 2 to 10 hours at 450° C. to 650° C., and then, with the binder disappearing by natural cooling, turns into a degreased body.

Then, by firing the powder compact (degreased body) in an air atmosphere at a firing temperature of 1500° C. or more and 1800° C. or less and holding at the firing temperature for 4 hours or more and 6 hours or less, a sintered body containing aluminum oxide as the main constituent and having an average particle size of the aluminum oxide crystals of 5 μm or more and 20 μm or less, can be obtained.

The insulating member 1 can be obtained by grinding each of the inner periphery and the outer periphery of the sintered body.

Although embodiments of the electromagnetic field control member of the present disclosure have been described above, the present disclosure is not limited only to the embodiments and various changes and improvements can be made within the scope of the present disclosure.

REFERENCE SIGNS

1 Insulating member
2 Flange
3 Shaft
4 Through hole
5 First power feed terminal
6 Second power feed terminal
7, 8 Line
9 Electrically conductive member
91, 92 Rod-shaped member
91*a*, 92*a* Body portion
91*b*, 92*b* Connecting portion
92*c* End surface
11 Space
12 Metallization layer
13A Inclined wall
13B Vertical wall
14 H-type terminal
14*a* Hole
14*b* First screw insertion hole
15 U-type terminal
15*a* Second screw insertion hole
16 Gap
18 Notch portion
19 Step
20 Groove
21 Step surface
22 Gap portion
23 Inclined surface
100 Electromagnetic field control member

The invention claimed is:

1. An electromagnetic field control member comprising:
an insulating member made of a ceramic having a cylindrical shape, the insulating member comprising a plurality of through holes extending along an axial direction;
an electrically conductive member configured to seal off each of the plurality of through holes, the electrically conductive member comprises a plurality of rod-shaped members connected to each other along the axial direction; and
a plurality of power feed terminals each having a plate shape and configured to bond with the electrically conductive member in a respective one of the plurality of through holes to supply electricity from the outside.

2. The electromagnetic field control member according to claim 1, wherein
the plurality of rod-shaped members are bonded to each other with a brazing portion.

3. The electromagnetic field control member according to claim 2, wherein
a number of the brazing portion is two or less.

4. The electromagnetic field control member according to claim 1, wherein
among the plurality of rod-shaped members, a rod-shaped member located at least in a center region of each of the plurality of through holes extending along the axial direction is longer than a rod-shaped member located in an end portion region of each of the plurality of through holes extending along the axial direction.

5. The electromagnetic field control member according to claim 1, wherein
an end surface of a tip portion of each of the plurality of rod-shaped members located at each of two end portions of a respective one of the plurality of through holes along the axial direction has a curved shape or comprises a corner portion having a chamfered structure.

6. The electromagnetic field control member according to claim 1, wherein
each of the plurality of rod-shaped members located at each of two end portions of a respective one of the plurality of through holes along the axial direction comprises a groove, a lower end of a respective one of the plurality of power feed terminals being fitted into the groove.

7. The electromagnetic field control member according to claim 6, wherein
the groove has a long shape, and an end surface of each of two end portions of the groove has a curved shape or comprises a corner portion having a chamfered structure.

8. The electromagnetic field control member according to claim 1, wherein each of the plurality of rod-shaped members comprises a body portion having a long shape and extending along the axial direction, and a connecting portion extending along the axial direction from the body portion, the connecting portion comprising a step surface located between an upper surface and a lower surface of the body portion or between both side surfaces of the body portion.

9. The electromagnetic field control member according to claim 8, wherein adjacent ones of the plurality of rod-shaped members are connected to each other by bonding the step surfaces of the connecting portions.

10. The electromagnetic field control member according to claim 8, wherein a gap portion is located between an end surface of the body portion in one rod-shaped member and an end surface of the connecting portion in the other rod-shaped member among adjacent ones of the plurality of rod-shaped members.

11. The electromagnetic field control member according to claim 1, wherein each of the plurality of rod-shaped members comprises a body portion having a long shape and extending along the axial direction a connecting portion extending along the axial direction from the body portion, the connecting portion comprising an inclined surface located between an upper surface and a lower surface of the body portion or between both side surfaces of the body portion.

12. The electromagnetic field control member according to claim 11, wherein adjacent ones of the plurality of rod-shaped members are connected to each other by bonding the inclined surfaces of the connecting portions.

13. The electromagnetic field control member according to claim 1, wherein a width between inner walls of the insulating member facing each other across each of the plurality of through holes gradually increases from inner periphery to an outer periphery of the insulating member, and an angle formed by the inner walls is 8° or more and 16° or less in a cross section orthogonal to the axial direction.

14. The electromagnetic field control member according to claim 1, wherein each of the plurality of power feed terminals comprises an H-type terminal and a U-type terminal configured to support the H-type terminal.

* * * * *